United States Patent [19]
Campbell

[11] Patent Number: 5,836,621
[45] Date of Patent: Nov. 17, 1998

[54] METHOD OF AND JOINT FOR ELECTROFUSION COUPLING OF THERMOPLASTIC PIPES

[76] Inventor: Steve Campbell, 4501 Lindell, Unit 11D/E, St. Louis, Mo. 63108

[21] Appl. No.: 960,004

[22] Filed: Oct. 29, 1997

Related U.S. Application Data

[62] Division of Ser. No. 654,104, May 28, 1996.

[51] Int. Cl.⁶ ..................................................... F16L 13/00
[52] U.S. Cl. ..................... 285/21.2; 285/331; 156/279.9; 156/397.1
[58] Field of Search .................................. 285/21.1, 21.2, 285/21.3, 22, 330, 331, 915; 219/535, 538, 552; 156/273.9, 347.7, 274.2

[56] References Cited

U.S. PATENT DOCUMENTS

| | | |
|---|---|---|
| 2,741,402 | 4/1956 | Sayre . |
| 2,785,910 | 3/1957 | Munger . |
| 3,061,503 | 10/1962 | Gould et al. . |
| 3,095,112 | 6/1963 | Weinstein et al. . |
| 3,422,179 | 1/1969 | Bauer et al. . |
| 3,768,841 | 10/1973 | Byrne et al. . |
| 3,961,814 | 6/1976 | Byrne et al. . |
| 4,090,899 | 5/1978 | Reich . |
| 4,176,274 | 11/1979 | Lippera . |
| 4,274,662 | 6/1981 | de Groot et al. . |
| 4,365,144 | 12/1982 | Reich et al. . |
| 4,526,410 | 7/1985 | Vohrer . |
| 4,530,520 | 7/1985 | Nyffeler et al. . |
| 4,530,521 | 7/1985 | Nyffeler et al. . |
| 4,649,641 | 3/1987 | Sichler . |
| 4,770,442 | 9/1988 | Sichler . |
| 4,865,674 | 9/1989 | Durkin . |
| 4,906,313 | 3/1990 | Hill . |
| 4,919,461 | 4/1990 | Reynolds . |
| 5,150,922 | 9/1992 | Nakashiba et al. . |
| 5,328,210 | 7/1994 | Stafford et al. . |
| 5,336,351 | 8/1994 | Meyers . |
| 5,362,114 | 11/1994 | Levingston . |
| 5,366,253 | 11/1994 | Nakashiba et al. . |

(List continued on next page.)

FOREIGN PATENT DOCUMENTS

| | | |
|---|---|---|
| 0 416 317 A2 | 10/1990 | European Pat. Off. . |
| 3720577 A1 | 4/1988 | Germany . |
| 42 21 454 A1 | 3/1994 | Germany . |
| 423 209 | 10/1963 | Switzerland . |

OTHER PUBLICATIONS

"Industrial Catalog" by *Central Plastics Company*, 1901 W. Independence, Shawnee, Oklahoma USA, 74802–3129, pp. 1–24.

"We're Not Just Another Pipe Company We're The Polyethylene Pipe Advantage" by *Poly Systems Incorporated*, Route 1, Box 486, Steelville, Missouri 65565.

"Liners Give Rusted Culverts New Life, Higher Capacity" by *Roads & Bridges*, Feb., 1994, p. 42.

"Permacore" by *Phillips Driscopipe, Inc.* (a subsidiary of Phillips 66 Company), 1990, pp. 1–12.

Primary Examiner—Dave W. Arola
Attorney, Agent, or Firm—Howell & Haferkamp, L.C

[57] ABSTRACT

A method and apparatus are disclosed for a thermoplastic pipe joint. The pipe joint consists of a channel machined or routed into each end of the pipes to be joined and a coupler manufactured from substantially the same type of thermoplastic material as the pipes, with an electrical resistance element embedded into the coupler. Application of power to the electrical resistance element raises the temperature of the interface between the coupler the pipe walls causing the thermoplastic material to form a fusion bond between the coupler and the pipes, resulting in a leak free joint with no interior flow obstructions or exterior collars or protrusions. There is also disclosed a method for electrofusion welding solid wall thermoplastic pipes without leaving an interior or exterior obstruction by machining a socket and nipple on the pipes to be joined and adding an electrical resistance element to the nipple.

17 Claims, 5 Drawing Sheets

U.S. PATENT DOCUMENTS

| | | |
|---|---|---|
| 5,375,889 | 12/1994 | Nakashiba et al. . |
| 5,407,514 | 4/1995 | Butts et al. . |
| 5,407,520 | 4/1995 | Butts et al. . |
| 5,410,131 | 4/1995 | Brunet et al. . |
| 5,433,484 | 7/1995 | Ewen et al. . |
| 5,462,314 | 10/1995 | Goto et al. . |
| 5,494,318 | 2/1996 | Butts ..................................... 285/21.2 |

METHOD OF AND JOINT FOR ELECTROFUSION COUPLING OF THERMOPLASTIC PIPES

This is a divisional of application Ser. No. 08/654,104 filed May 28, 1996, which is still pending.

FIELD OF THE INVENTION

This invention relates generally to the electrofusion welding of pipes made from thermoplastic materials including polyethylene, polyvinyl chloride, nylons, polybutylene, polypropylene and the like. Specifically, this invention relates to electrofusion welding of such pipes to result in a joint which has substantially flush interior and exterior surfaces and provides constant inside and outside diameters.

BACKGROUND OF THE INVENTION

This invention pertains to the joining of thermoplastic pipes including polyolefin, polyethylene, polyvinyl chloride, nylon, polybutylene, polypropylene and the like. These types of materials are gaining popularity in water, sewer, culverts and industrial piping because of their characteristics of being lightweight, corrosion resistance, strong and durable. "Trenchless" rehabilitation of culverts, storm sewers, sanitary sewers and other underground pipes, by "slip lining" or "insert renewal" with thermoplastic pipes is gaining popularity and growing rapidly throughout the United States and other countries. In this process, a thermoplastic pipe or liner is inserted into an existing pipe or culvert without removal of the deteriorated pipe. The replacement pipe is pushed into or pulled through the existing culvert. In many cases, an existing pipeline can be rehabilitated for a fraction of the cost of replacement and with minimal inconvenience to the public.

Thermoplastic pipes, including polyethylene, are the preferred pipe material for many rehabilitation projects because of the price and the above-noted characteristics. Generally, thermoplastic pipe is manufactured in lengths which are sufficiently short to permit transportation and handling. In the field, where the pipe is to be installed, the short pipe sections must be connected to form a continuous pipe of a predetermined length appropriate for the application.

The joining or connecting of thermoplastic pipes can present many problems because of the variety of field conditions encountered and because of thermoplastic pipes chemical resistance, which, in many cases, makes such pipes impervious to glues or cements. Also, some thermoplastic pipes have a tendency to "creep," or move, when subjected to changing temperatures. Because most applications include exposure to such temperature changes, such movement or "creeping" limits the ability to use mechanical type joints such as threads.

In general, several methods exist to join thermoplastic pipe in the field. A first method is "butt fusion" as it is known in the art. This method involves the use of a butt fusion machine which includes line up equipment and a hot plate. The ends of two pipes to be joined are inserted into the line up equipment which aligns and advances the pipe ends toward one another as necessary. The two pipe ends are pressed against a heat plate which heats and softens the two pipe ends. The heat plate is then removed and the line up equipment advances the two pipes toward one another at a predetermined rate in order to fuse the pipe ends together. This type of butt fusion requires special fusion equipment that is expensive and not always available in the field.

Another method is the use of electrofusion collars or inserts. One type of electrofusion collar is shown in U.S. Pat. No. 4,530,521 to Nyffeler, et al. One type of electrofusion insert is shown in U.S. Pat. No. 3,768,841 to Byrne at al. These devices, as shown in the references, use a sleeve, collar or insert made of thermoplastic material and which either fits over or into is the pipes to be joined. The pipes, and the collar or insert are first heated to soften the thermoplastic material. If using a collar, the pipe ends are inserted into the collar and are thereby joined. If using an insert, the insert is inserted into each pipe end thereby joining the pipes. The heating can be performed with fusion equipment or the collar or insert can contain an electrical element to allow electrofusion welding of the pipes to the collar or insert.

These devices have the disadvantage of interior obstructions or exterior protrusions which are not acceptable in many applications. Because the collar must be large enough to accept insertion of the pipe ends, the resulting joint does not have a flush exterior. Because the insert reduces the inside diameter of the pipes at the joint, the insert acts as an obstruction to flow through the pipe. This is unacceptable in most applications, including most trenchless rehabilitation projects, because interior flow obstruction is not acceptable. Furthermore, exterior collars impede insertion of the replacement of the pipe during slip lining and require the use of smaller diameter replacement pipes so that the collar can fit over the pipe and inside the existing pipe or culvert.

Another method of joining thermoplastic pipes is electrofusion rods or mesh as shown in U.S. Pat. No. 5,410,131 to Brunet et al. Although this device requires no collar or insert, the application requires substantial end pressure to join the two pipe ends. Such pressure is usually supplied by special line up equipment due to the weight of the pipes and this equipment is expensive and not always available or practical for use in field conditions.

Another method, hot air gun welding uses a welding rod of thermoplastic material fed through the nozzle of a hot air gun. The hot air gun applies heat to the ends of the pipe to be welded and melts the welding rod which is applied to a bevel cut between the two ends of the pipe to be joined. Line up equipment must be used, as with the butt fusion methods, and this method has not proven satisfactory in field conditions due to a lack of uniformity in the welding process.

As thermoplastic resin prices increase, plastic pipe manufacturers are constantly looking for manufacturing methods to make pipe lighter without losing physical strength. One type of thermoplastic pipe gaining popularity is "profile wall pipe" as it is known in the art. An example of this type of pipe is shown in U.S. Pat. No. 5,362,114 to Levingston. Profile wall pipe is thermoplastic pipe formed by extrusion to have an inner cylindrical wall, a generally concentric outer cylindrical wall and a helical rib between and connecting the inner wall and outer wall.

Profile wall pipe is lighter than solid pipe and uses less material thereby reducing resin costs, but it maintains a high degree of strength. Because it is lighter than solid wall it generally has a competitive advantage over solid wall plastic pipe. Profile wall pipe is popular in the industry because it uses less material and is lighter in weight than solid thermoplastic pipe. Unfortunately, typical methods of fusing thermoplastic pipe are unacceptable and do not work on profile wall pipe because the end walls of such pipe do not present a solid annular surface due to the presence of the helical rib contained in the pipe.

For example, butt fusion is very difficult on profile wall pipe because the pipe ends of profile wall pipe are not solid. The profile wall pipe ends have a thin inner wall, a thin outer wall and a "profile space" the depth of which is equal to the distance between the end of the pipe and the helical rib which connects the inner and outer walls. The same problems that exist in joining solid wall thermoplastic pipes are multiplied in profile wall pipes because of their relatively thin inner and outer walls with a large profile space between the walls.

For example one manufacturer produces a polyethylene 10" inch inside diameter profile wall pipe that has inner and outer wall thicknesses of 0.065" inches to 0.079" inches. This particular pipe has a profile distance over 1 inch between the inner and outer walls with an outside diameter of approximately 11.20" inches. A 36" inch inside diameter profile wall pipe from the same manufacturer has inner and outer wall thicknesses of approximately 0.195" to 0.228" inches and an outside diameter of approximately 40.65" inches giving a profile distance between the inner and outer walls over 4 inches.

Butt fusion of profile wall pipes is very difficult due to the thin wall thickness compared to the overall diameter. Setting the correct hydraulic pressure on a butt fusion machine for such thin walls and large diameters would result in extremely slow fusion machine carriage movement and potential cooling of the thermoplastic prior to fusion joining. This results in a failed weld or "cold joint." Rods or mesh alone also will not work on profile wall pipe because profile wall pipe does not have solid flat pipe end surfaces which are required in those methods.

Hot gas welding on profile wall pipes will not achieve a strong, uniform joint even with the most experienced welders. Electrofusion collars or inserts would be very bulky and either seriously interrupt interior flows or have a very large collar on the outside of the pipe, making the pipe joint unsuitable for slip lining or pipe rehabilitation applications.

One method for joining profile wall pipes is shown in U.S. Pat 5,362,114 to Levingston. As shown therein, profile wall pipe is joined by threaded engagement. The threads, formed by the helical rib, are revealed by shaving away the inner wall of one pipe section and the outer wall of another pipe section. This allows the two pipe sections to be threaded together. However, this method requires the use of sealants or gaskets to make the joint water tight or leak-proof and does not provide the beneficial characteristics of a fusion welded joint. For example, a fusion weld is also air tight whereas a threaded joint is not acceptable for gas pipelines which require air tight seals.

Thus, prior art collars or inserts result in interior flow obstructions and or collars or exterior protrusions which would prevent the pipe insertion in trenchless applications. Prior art welding rods or mesh require line up equipment to push the ends of the pipes together in solid wall pipe and would not be acceptable for the joining of profile wall pipes. Prior art threaded methods for joining profile wall pipes are not leak proof without sealants or gaskets. Furthermore, specifications in many applications call for a leak-proof joint that has a flush interior and exterior pipe surface and in trenchless applications is strong enough to withstand pulling or pushing the pipe through an existing pipeline. The above type methods do not satisfy these specifications.

SUMMARY OF THE INVENTION

The present invention results in a uniform, strong, leak-proof joint with no inner or outer obstructions, making it suitable for trenchless, slip line applications, in addition to direct burial applications. The present invention requires no fusion machine, or special line-up equipment to apply end pressure. The present invention also uses an electrical resistance screen element which is an improvement over resistance wires in both cost and the uniform heat distribution a screen provides.

In the present invention, profile wall or solid wall pipe is furnished with a channel machined or routed in an end wall between the inner and outer walls of the pipe. This channel may also be field fabricated with the use of a routing tool mounted on a plate with roller guides, to prevent it from digging into the inner or outer walls of the pipe, and provides an even groove to a predetermined depth. An electrofusion coupler manufactured from like thermoplastic material with a stainless steel electrical resistance element embedded into a surface of the coupler is inserted into the channel. A terminal pin is attached to each end of the electrical resistance element for connection to a power source.

The coupler is configured to provide a tight interference fit between the inner and outer walls of the profile wall pipe. The ends of the coupler are slightly beveled or chamfered to facilitate the insertion of the coupler into the channel of each pipe. To form the pipe joint, the coupler is pushed into the channel in the adjacent end walls of the pipes to be joined. A power source is connected to the terminal pins of the electrical resistance element which protrude from the joint.

Preferably an electrofusion control unit furnishes a predetermined electrical current required to heat the electrical resistance element and partially melt the thermoplastic coupler and the pipe walls. The coupler during the heating cycle expands at a greater rate than the pipe walls due to the attachment of the electrical resistance element thereon. This develops additional internal bonding pressures to produce a fusion bond of adequate depth and continuity to form a pressure tight pipe joint, that is substantially flush with the pipe walls, leaving no interior flow restrictions or exterior collars or obstructions.

In the case of a solid wall thermoplastic pipe, the present invention is provided on the exterior wall of one pipe end that has been machined or shaved approximately one half of the wall thickness on the exterior portion of the pipe wall thereby forming a nipple. On the second pipe to be joined, the interior wall of the pipe is machined or shaved approximately one half of the wall thickness, thus forming a socket. Upon insertion of the nipple into the socket, a pipe joint is formed without any collar or other exterior or interior obstructions.

An electrofusion coupling is formed by embedding a stainless steel electrical resistance element into the exterior surface of the nipple. A terminal pin is attached to each end of the electrical resistance element to allow connection to a power source outside the joint. The nipple and socket are machined to provide a tight interference fit between the two pipes. The edge of the nipple is slightly beveled or chamfered to facilitate the insertion of the nipple into the socket.

To form the pipe joint, the nipple containing the electrical resistance element is inserted into the socket. A power source is connected to the terminal pins, preferably an electrofusion control unit furnishing a predetermined electrical current required to heat the mesh or resistance wires and partially melt the nipple and socket thereby forming a fusion weld. The nipple expands at a greater rate than the socket due to the attachment of the electrofusion element thereto. This develops additional internal bonding pressures to produce a fusion bond of adequate depth and continuity to form a pressure tight pipe joint that is substantially flush with the pipe walls and leaves no interior obstructions or exterior collar.

Also provided is the use of a single continuous piece of stainless steel or other metal screen as the electrical resistance element. The advantage of a one piece screen versus a helical heating coil or mesh is a complete coverage of the required heating area without the potential to short out due to movement of the wire or loss of insulation on the mesh. This method in production may be considerably less expensive that other resistance heating methods.

While the principal advantages and features of the invention have been described above, a greater understanding of the invention may be attained by referring to the drawings and the description of the preferred embodiment which follow.

DETAILED DESCRIPTION OF THE PREFERRED EMBODIMENT

Figure 1:
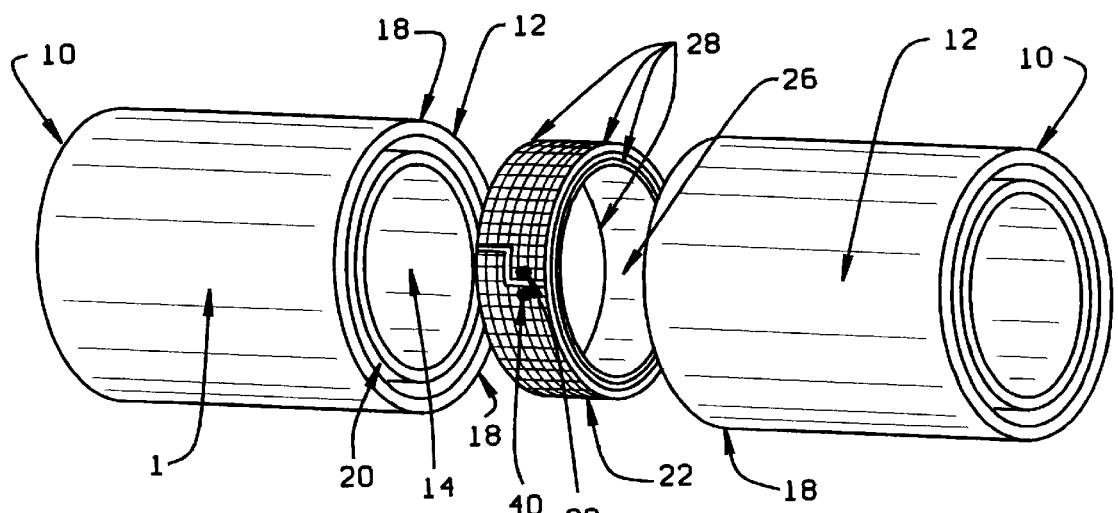
FIG. 1 is an exploded perspective view of two square profile wall pipes showing the coupler between the two pipes prior to being joined.

A first embodiment of the present invention is shown in FIG. 1. Identical profile wall pipes 10 are shown. Because the pipes are identical in this embodiment of the invention, only one pipe will be described in detail, however, it is understood that the detailed description of the pipe in this embodiment applies equally to each pipe unless otherwise specified. Profile wall pipes 10 comprise a generally cylindrical outer wall 12, a cylindrical inner wall 14 substantially concentric with outer wall 12 and a helical rib 16 located generally between the walls 12 and 14 and joining the walls 12 and 14 together. The convolutions of the rib 16 extend in multiple turns around the exterior of the inner wall 14 and along the interior of the outer wall 12 for substantially the entire length of each pipe 10. Rib 16 advances incrementally along the longitudinal axis of pipe 10 as it winds around pipe 10 and thereby forms a profile space 11 between each wind of the rib 16 around the pipe 10. Both outer wall 12 and inner wall 14 terminate at an end wall 18.

In the preferred embodiment, the profile wall pipe is polyethylene pipe 10 manufactured by extrusion so that each length of pipe is one integral piece of material. Outer wall 12, inner wall 14 and rib 16 all extend the full length of pipe 10. Outer wall 12 and inner wall 14 have relatively smooth surfaces and terminate at end wall 18. Rib 16 is not flush with the plane of the end wall 18 for the entire circumference of pipe 10 at end wall 18 because the helical rib 16 advances incrementally along the longitudinal axis of pipe 10 with each turn around pipe 10. Each turn of rib 16 represents 360 degrees of angular extension of rib 16 about the longitudinal axis of pipe 10.

Figure 2:
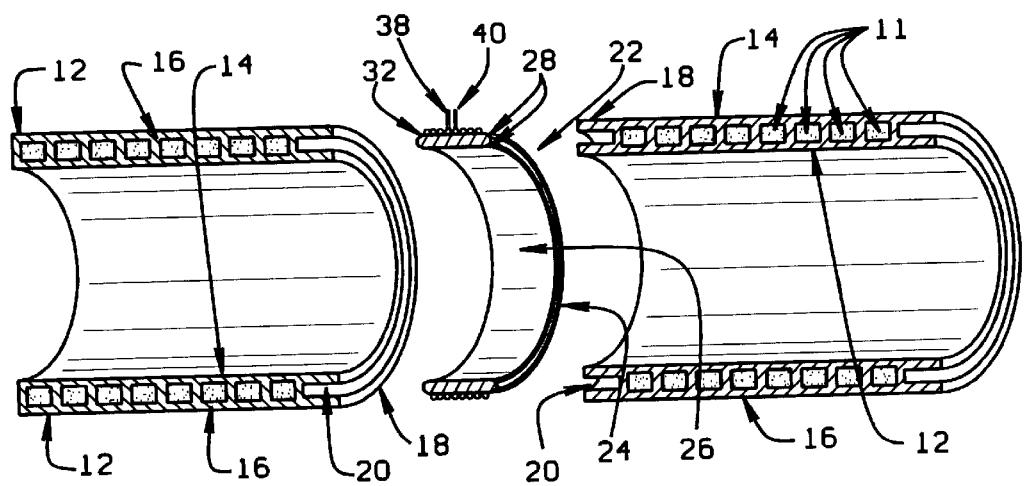
FIG. 2 is a cross sectional view of the two square profile wall pipes and the coupler therebetween prior to being joined.
Figure 10:
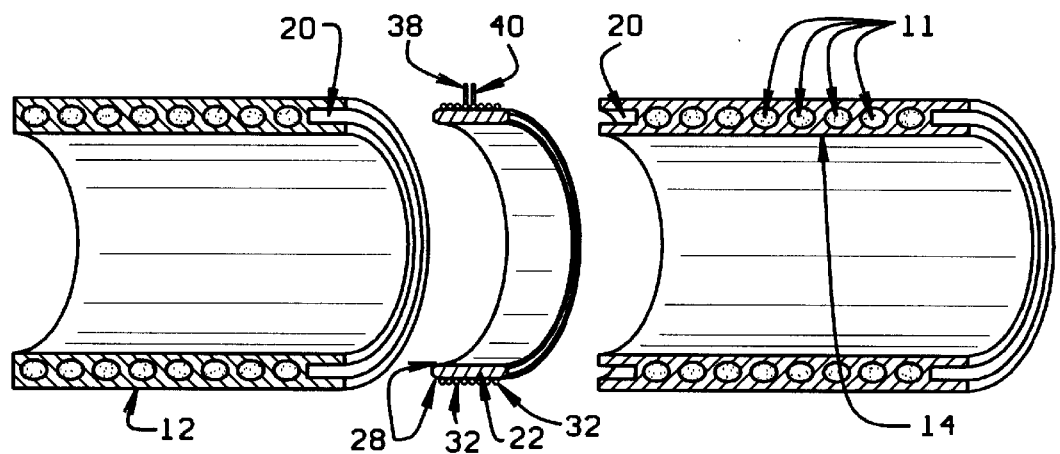
FIG. 10 is cross sectional view of two square profile wall pipes showing the coupler therebetween prior to being joined.

Profile space 11 is formed during the manufacture of profile wall pipe 10 and bordered on the exterior by outer wall 12, on the interior by inner wall 14 and on each side by rib 16. Profile space 11 can be square, as shown in FIG. 2 or round, as shown in FIG. 10, depending on the extrusion process. Either round or square profile pipe is acceptable for the present invention.

Referring to FIG. 2, rib 16 advances along the longitudinal axis of pipe 10 as it traverses the length of pipe 10 and connects outer wall 12 and inner wall 14. In profile wall pipes, before application of the present invention, the depth of profile space at an end of pipe 10, measured from the plane of end wall 18, increases along the circumference of end wall 18. The amount of increase in the depth of the profile space is a function of the longitudinal advance of rib 16 with each turn around pipe 10.

In the preferred embodiment, shown in FIG. 2, endwall 18 of pipe 10 has a channel 20 formed therein for receiving coupler 22. Channel 20 is formed by removing a portion of rib 16 between outer wall 12 and inner wall 14. The amount of rib 16 which is removed depends on the desired depth of channel 20. The depth of channel 20 must be equal to or greater than a predetermined value which is dependent on the size of coupler 22 as described below. In the preferred embodiment, the depth of the channel 20 must equal or exceed the predetermined depth for the entire circumference of end wall 18.

Figure 3:
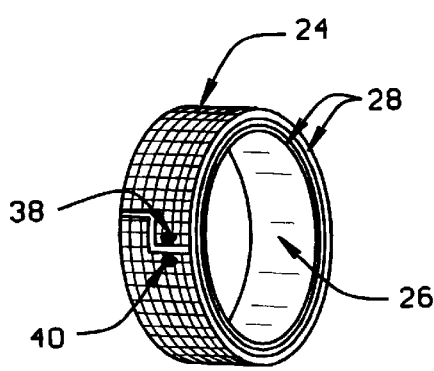
FIG. 3 is a perspective view of the coupler with the electrical resistance element placed thereon.

Coupler 22, shown in FIG. 3, is an annular ring having an exterior surface 24 and an interior surface 26. Coupler 22 is configured with an inside diameter and an outside diameter to allow insertion of coupler 22 into channel 20. However, the configuration of coupler 22 must also allow mating of coupler exterior surface 24 with outer wall 12 of each pipe 10 and mating of coupler interior surface 26 with inner wall 14 of each pipe 10.

Figure 4:
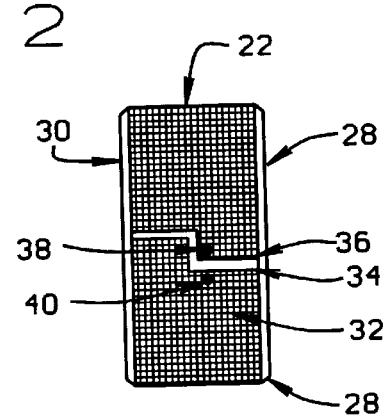
FIG. 4 is a side view of the coupler of FIG. 3.

Referring to FIG. 4, coupler 22 has an axial width, measured from edge 28 to edge 30, which is determined by the size of pipe to be joined. The depth of channel 20 (FIG.

2) in the preferred embodiment must be equal or greater than ½ the width of coupler 22. Coupler 22 has a thickness, measured from exterior surface 24 to interior surface 26, which is approximately equal to the distance between inner wall 14 and outer wall 12 of each pipe 10. This allows for an interference fit of coupler 22 within channel 20 of each pipe. The edges 28 and 30 of coupler 22 are beveled or chamfered to facilitate insertion into channel 20.

Figure 5:
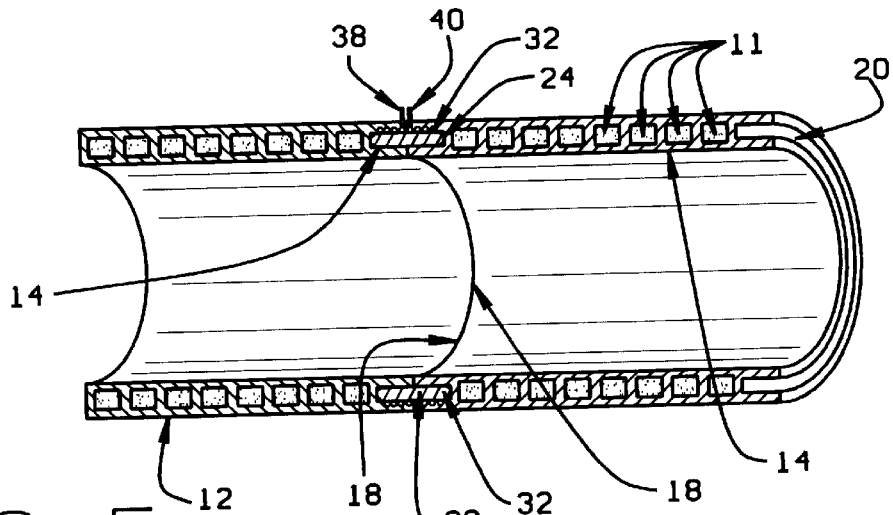
FIG. 5 is a cross sectional view of two square profile wall pipes united, end wall to end wall, with the coupler in the channel of each pipe.

Referring to FIG. 5, upon insertion of coupler 22 into channel 20 of each pipe 10, the end walls 18 of the pipes 10 should abut against one another to allow for a substantial flush pipe joint with a substantially continuous and flush inner wall and a substantially flush and continuous outer wall. As set forth above, a pipe joint with substantially flush inner and outer walls provides for a pipe joint which will not impede flow through the pipe nor impede insertion of the joined pipes in an existing culvert. The present invention also allows the entire length of joined pipe to have a substantially uniform outside diameter and inside diameter which is not available in the prior art.

In the present invention, two 10" inch inside diameter profile wall pipes were joined using a coupler having a width of approximately 3" inches. This resulted in a sufficient amount of mating surface to create a strong, uniform and water tight joint. The 3" inch coupler required a channel with a depth of at least 1-½" inches in each pipe for receiving the coupler. As the diameter of pipes to be joined increases, the size and width of coupler also increases. For example, to join two 42" inch inside diameter pipes would required a coupler with approximately an 8" inch width.

The thickness of the coupler is determined by the "profile" distance (the distance between the inner wall and outer wall) of the pipes to be joined. For example one manufacturer produces a polyethylene pipe with 10" inch inside diameter and an outside diameter of approximately 11.20 inches. The inner and outer wall thicknesses of this particular profile wall pipe range between 0.065" inches to 0.079" inches. Therefore, this particular pipe has a profile distance just over 1 inch, calculated by subtracting the sum of the inside diameter and the inner and outer wall thicknesses from the outside diameter. A 36" inch inside diameter profile wall pipe from the same manufacturer has a wall thickness of approximately 0.195 to 0.228 inches and an outside diameter of approximately 40.65 inches resulting in a profile distance between the inner and outer walls over 4 inches.

Figure 6:
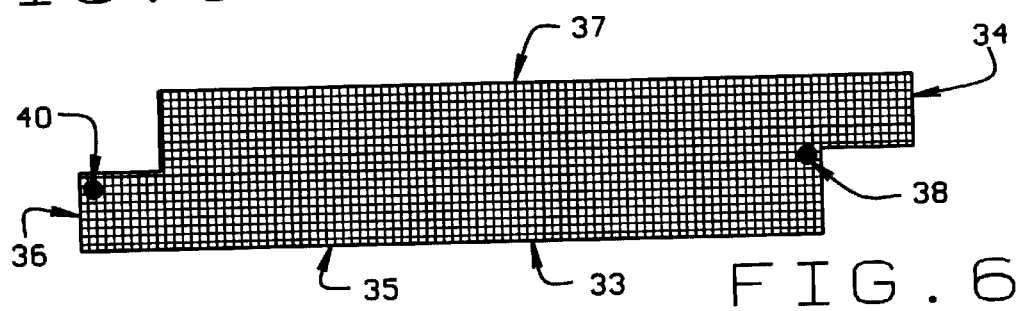
FIG. 6 shows a flat electrical resistance element screen prior to attachment to the coupler.

In the preferred embodiment, coupler 22 includes an electrical resistance element 32, shown in FIG. 5, to provide the heat required to fuse coupler 22 to inner wall 14 and outer wall 12 of pipes 10. The electrical resistance element of the preferred embodiment, shown in FIG. 6 before attachment to coupler 22, is a stainless steel screen 33. Screen 33 has ends 34 and 36 with terminal pins 38 and 40 electrically connected thereto. Screen 33 also has a length, measured from end 34 to end 36 and width, measured from side 35 to side 37, sufficient to cover the exterior surface 24 of coupler 22.

Ends 34 and 36 are configured to allow overlap of end 34 with end 36 around the circumference without making contact therebetween. This prevents shorting the electrical resistance element 32 when it is energized and allows uniform heating over entire exterior surface 24 of coupler 22. Terminal pins 38 and 40 are located at opposite ends of screen 33 to provide for electrical connection of a power source (not shown) to screen 33 for energization of screen 33.

Figure 7:
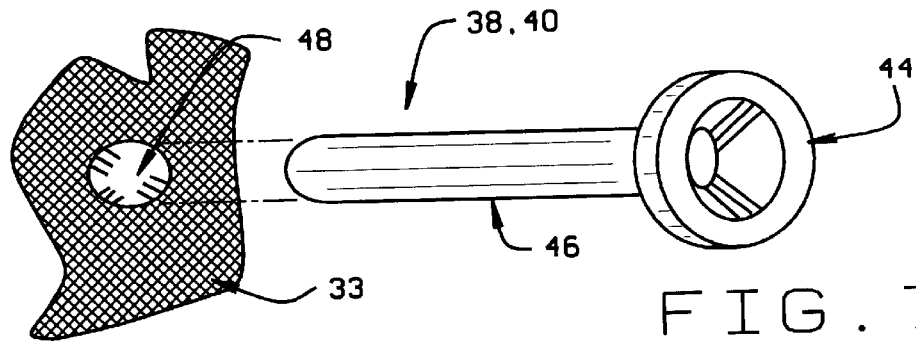
FIG. 7 is a perspective view of a terminal pin before insertion into the screen.

Terminal pins 38 and 40 are electrically connected to electrical resistance element 32. In the preferred embodiment, terminal pins 38 and 40, shown in FIG. 7 before attachment to screen 33, have a base 44 and an extension 46. Base 44 has a larger circumference than extension 46 to allow extension to be inserted in an opening of screen 33 without pulling base 44 through opening 48. Terminal pins 38 and 40 may be made of any type of electrically conductive material such as copper or stainless steel but must be of sufficient gauge to allow transfer of enough electrical current to the electrical resistance element 32 as required to fuse the coupler 22 to channel 20.

Referring to FIG. 4, terminal pins 38 and 40 are attached to ends 34 and 36 and positioned to be aligned with the center of coupler 22, equidistant from sides 35 and 37, when screen 33 is wrapped around coupler 22. Terminal pins 38 and 40 are positioned in this fashion to protrude between abutted end walls 18 of pipes 10 to allow electrical connection of screen 33 in channel 20 to an external power source (not shown).

To energize screen 33, the power source (not shown) is connected across to terminal pins 38 and 40 of screen 33 by connecting the positive lead from the power source to one terminal, for example 38, and the negative lead from the power source to the second terminal, for example 40. As electrical current is run through screen 33, screen dissipates heat to coupler 22 and pipes 10.

Referring to FIG. 5, after coupler 22 is inserted into channel 20, terminal pins 38 and 40 are connected to a power source (not shown), as described above, which supplies a predetermined amount of electrical current sufficient to heat electrical resistance element 32 and soften coupler 22 and the appropriate mating surface of the pipes. The interference fit between coupler 22 and pipe 10 develops sufficient bonding pressure as coupler 22 softens and expands causing pressure at the inner wall 14 and outer wall 12. Inner wall 14 and outer wall 12 also are heated from energization of electrical resistance element 32 and this produces a uniform and strong fusion bond between coupler 22 and pipes 10.

In the preferred embodiment, electrical resistance element 32 is embedded into the exterior surface 24 of coupler 22. The electrical resistance element can also be attached to the interior surface 26 of coupler 22. In the alternative, electrical resistance element 32 can be embedded in inner wall 14 or outer wall 12 of the pipes. The exact location of electrical resistance element 32 is not critical as long as it is within sufficient proximity to both the coupler 22 and at least one pipe wall 12 or 14 so that upon energization of electrical resistance element 32, coupler 22 will be fused to pipes 10.

Electrical resistance element 32 of the preferred embodiment is comprised of stainless steel screen 33. However, any electrically conductive material, such as wire, screen, mesh, or helical resistance wire, is acceptable provided upon energization it produces sufficient heat to fuse coupler 22 within channel 20 of each pipe. The use of screen 33 decreases the likelihood of an electrical short as often occurs with an electrical resistance element made of a single wire.

Figure 8:
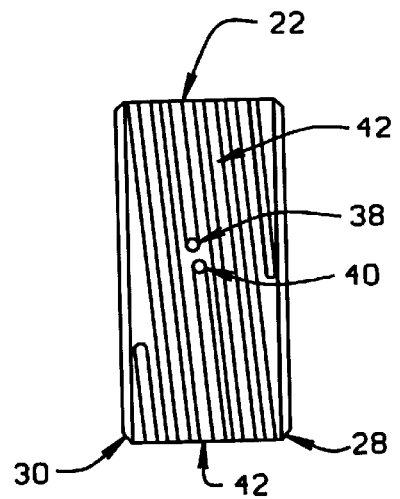
FIG. 8 is a direct view of a coupler with an electrical resistance element in the form of a helical wire wound around coupler.

For example, as shown in FIG. 8, electrical resistance element is formed by wrapping a single wire 42 in successive turns around coupler 22 toward each edge 28 and 30. During insertion of coupler 22 into channel 20, due to the required interference fit, one turn of single wire 42 could be forced into an adjacent turn of wire thereby shorting the circuit and preventing electricity from conducting past the short. This would result in only a portion of coupler 22 being fused to the pipes.

In the preferred embodiment, electrical resistance element 32 is embedded into the exterior surface 24 of coupler 22. It is preferred that electrical resistance element 32 be sufficiently held on coupler 22 to prevent the electrical resistance element 32 from moving during the insertion of the coupler 22 into the channel 20 due to the interference fit between coupler 22 and channel 20. If a stronger joint is desired, a second electrical resistance element can be added to the interior surface 26 of coupler 22. Proper placement of electrical resistance element 32 in channel 20 provides for a continuous and uniform fusion weld at the joint.

Coupler 22 can be manufactured with electrical resistance element 32 embedded therein or the embedding can be accomplished in the field. In the manufacturing process, electrical resistance element 32 can be embedded using techniques known in the art currently used for manufacturing electrofusion collars or inserts. In the alternative, electrical resistance element 32 can be placed around the coupler 22 and covered with a like thermoplastic material. If electrical resistance element 32 is to be attached to inner wall 14 or outer wall 12 of pipe 10, the same techniques can be used when manufacturing the pipes to attach electrical resistance element in channel 20.

In the field, electrical resistance element 32 can be embedded into exterior surface 24 of coupler 22 by wrapping electrical resistance element 32 around coupler 22 and applying pressure to urge it into the exterior surface of coupler 22 while energizing electrical resistance element 32. The pressure can be applied using a clamp (not shown), or a binder (not shown) which can be shaped around coupler 22 and electrical resistance element 32.

FIG. 5 is a cross sectional view showing coupler 22 inserted in channel 20 joining the pipes 10 prior to energization of electrical resistance element 32. As is shown, end walls 18 of pipes 10 are abutting against one another and the exterior surface 24 of coupler 22 is adjacent the outer walls 12 of pipes 10. The interior surface 26 of the coupler 22 is adjacent the inner walls 14 of pipes 10. Electrofusion element 32 is positioned between exterior surface 24 and outer walls 12 of pipes 10. Terminal pins 38 and 40 extend between abutted end walls 18 to allow connection to power source (not shown).

Any power source capable of supplying adequate power to the electrical resistance element is acceptable for the present invention. For example, a variable current electrical welder is acceptable as are any type of power supplies used in the prior art for fusion welding of thermoplastic pipes using electrofusion collars and inserts. Preferably, an electrofusion control unit is used for the power source, as are known in the art, to furnish a predetermined amount of electrical current which is required to heat the screen 33 and partially melt exterior surface 24 of coupler 22 and inner wall 14 and outer wall 12 of pipes 10.

The coupler 22 expands during heating at a greater rate than the pipe walls due to the attachment of the electrical resistance element thereon. This develops additional internal bonding pressure to produce a fusion bond of adequate depth and continuity to form a pressure tight pipe joint, that is substantially flush with the pipe walls, leaving no interior flow restrictions or exterior collars or obstructions.

A variety of power sources exist in the art which will supply the correct amount of current for each pipe size. Existing electrofusion control units are capable of measuring heat levels and/or maintaining a measured welding time at a predetermined current to form a structurally sound leak-proof joint upon cooling. However any experienced fusion welder with charts showing the recommended current and heating time for each size and composition of pipe, is capable of forming a leak-proof joint using any available, variable ampere, direct current welder, as a power source.

Figure 9:
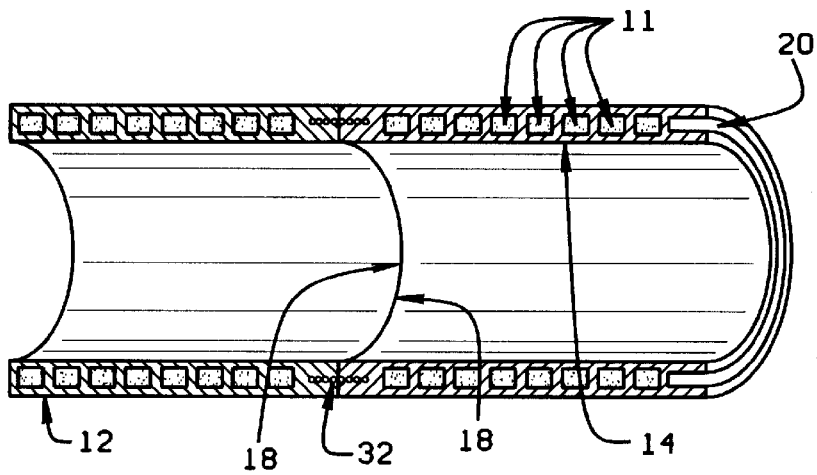
FIG. 9 is cross sectional view of two round profile wall pipes with the coupler between the pipe sections after being joined and electrofusion welded.

FIG. 9 shows a complete joint using the present invention after screen 33 has been energized and the fusion weld is complete. As is shown, the present invention results in a substantially flush joint both interior and exterior and a substantially uniform outside diameter and inside diameter throughout the length of the joined pipes.

Figure 11:
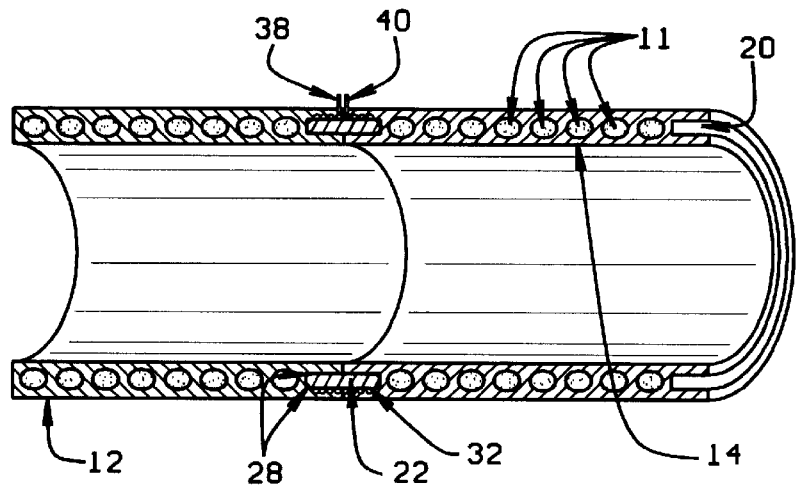
FIG. 11 is cross sectional view of two round profile wall pipes showing the coupler between the pipe sections and in the channel of each pipe.
Figure 12:
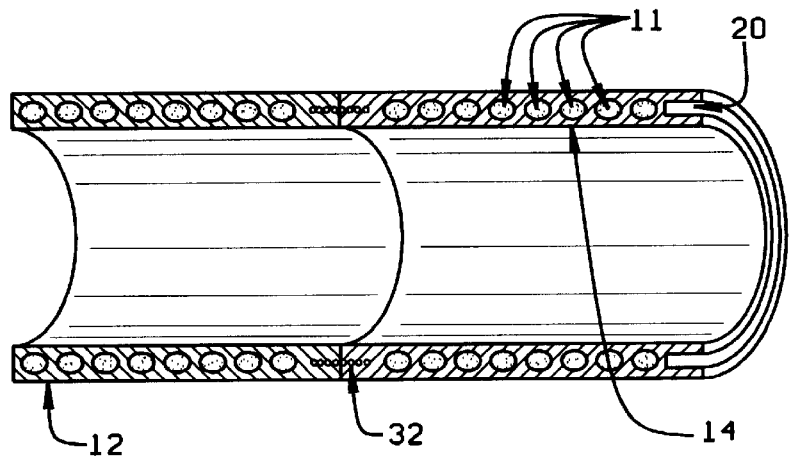
FIG. 12 is a cross sectional view of two round profile wall pipe sections after being joined and electrofusion welded.

FIGS. 10 through 12, show the first embodiment of the present invention as described above. The only difference between these embodiments being the shape of the profile space 11 in the profile wall pipe used. The detailed description above is equally applicable to round profile wall pipe as discussed above with like numbers referring to like elements.

Having described the apparatus, a method for forming the pipe joint of the first embodiment between two pipes is explained. As noted above, the first embodiment is particularly adapted for use with profile wall pipe, and produces a pipe joint with substantially flush interior and exterior surfaces. This method is equally applicable to solid wall thermoplastic pipe having a sufficient wall thickness to allow the formation of a channel 20 between an inner wall 14 and an outer wall 12. The method will be explained assuming profile wall pipe, however, the only requirement for the present invention is that the pipe be capable of having a channel 20 at an end wall 18 for receiving a coupler 22 therein.

To practice the method of the present invention, pipes 10 are modified to include a channel 20 in each end wall 18. This can be performed by routing or machining taking care not to remove inner wall 14 or outer wall 12 in the process. In profile wall pipe, the creation of channel 20 is made simpler by the lack of a solid wall at end walls 18. As stated above, profile wall pipe is manufactured having a profile space 11 formed by inner wall 14 outer wall 12 and rib 16. Therefore, at the end wall 18 of a section of profile wall pipe 10, profile space already exists prior to routing. However, removal of rib 16 is required in order to form channel 20 with a minimum depth the entire circumference of end wall 18.

The amount of rib 16 which must be removed is dependent upon the depth of channel 20 required, the size of rib 16 and the width of profile space 11. It is preferable to have the depth of channel 20 uniform, however, all that is required is that the shallowest segment of channel 20 be greater than or equal to ½ the width of coupler 22. After channel 20 is formed in end walls 18 of pipes 10, the coupler can be inserted into the channel.

In the preferred embodiment, edges 28 and 30 of the coupler are beveled to easier insertion of coupler 22 into channel. In the preferred embodiment, electrical resistance element 32 is embedded into exterior surface 24 of coupler 22. If electrical resistance element 32 is not attached to coupler 22, this must be accomplished prior to insertion of coupler into pipe 20. An electrical resistance element, such as screen 33 is wrapped around exterior surface 24 of coupler 22. A clamp (not shown) or adjustable binder (not shown) is tightened over screen 33 urging screen 33 onto coupler 22. Terminal pins 38 and 40 should be aligned in the center of coupler 22 equidistant from edges 28 and 30. This allows the extension of terminal pins 38 and 40 to extend between abutment of end walls 18 after coupler 22 is inserted into channel 20 of each pipe 10 to be joined.

To embed screen 33 into exterior surface 24 of coupler 22, power source (not shown) is electrically connected to terminal pins 38 and 40. A positive lead is attached to one terminal, for example 38 and the negative lead from power source is attached to other terminal pin, for example 40. Screen 33 is then energized by power source (not shown) causing electrical current to flow through screen 33. Screen 33 should be energized long enough to attach screen 33 sufficiently to coupler 22 to hold screen 33 in place during insertion of coupler 22 into channel 20. In the preferred embodiment, screen 33 is energized until coupler 22 begins to protrude through openings in screen 33.

After attachment of screen 33 to coupler, coupler is inserted into channel 20 of each channel 20. In the preferred embodiment, coupler 22 is inserted to a depth of one-half of its width into each pipe 10. This allows abutment of end walls 18 of each pipe 10 and provides an mating surface between coupler 22 and each pipe 10. After coupler 22 is inserted into channel 20 of each pipe 10, screen 33 is energized, as described above by connecting power source to terminal pins 38 and 40. Screen should be energized for a sufficient duration to cause pipes 10 to be fusion welded to coupler 22. The amount of power and duration are determined by the types of thermoplastic material from which pipes 10 are made and the amount of heat necessary to create the fusion weld. As stated above, the amount of heat and power necessary is known in the art of electrofusion welding using electrofusion couplers and inserts.

A second embodiment of the present invention for use on solid wall thermoplastic pipes is shown in FIGS. 13–17. A first solid wall pipe 50 and a second solid wall pipe 52 can be joined using the principles of the present invention by modifying a first pipe end 54 and a second pipe end 56 for use with electrical resistance element 32. This embodiment creates a substantially flush interior and exterior pipe joint and a substantially uniform outside diameter and inside diameter. As shown, first pipe 50 and second pipe 52 have substantially equal outside diameters, substantially equal inside diameters and each has a substantially uniform circumference. First end 54 and second end 56 have substantially the same inside diameter and outside diameter as pipes 50 and 52.

The outside diameter of first end 54 is machined or shaved to form a male nipple 58. In order to allow for a pipe joint having a substantially flush interior and substantially flush exterior, nipple 58 is formed by decreasing outside diameter of first end 54 and thereby decreasing the wall thickness. At one end of nipple 58 is shoulder 61 where the nipple 58 meets the remainder of first pipe 50 and is formed by the difference in outside diameter between nipple 58 and first pipe 50. At the other end of nipple is nipple edge 60 which can be beveled or chamfered. Between nipple edge 60 and shoulder 61 is nipple exterior surface 74.

Figure 14:
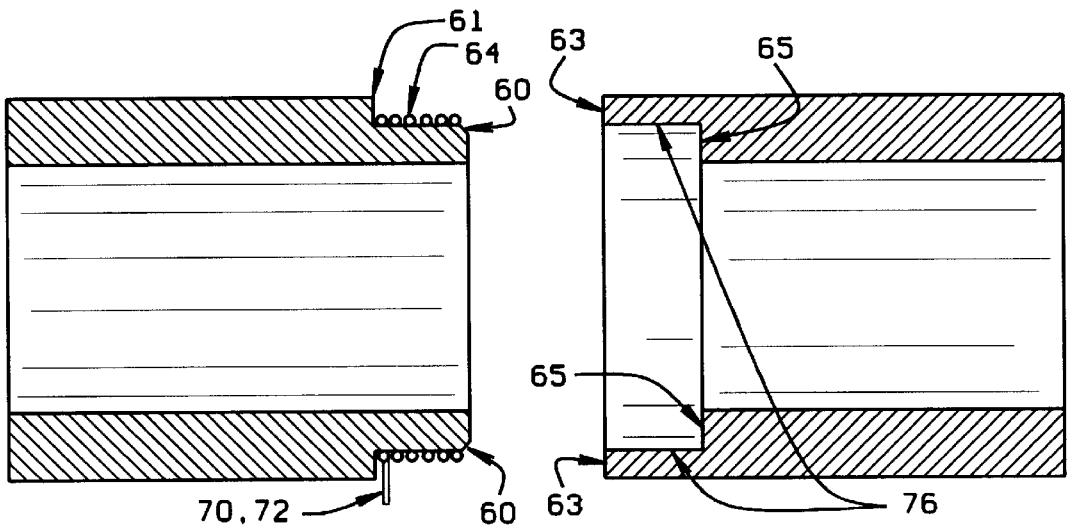
FIG. 14 is a direct view of two solid wall thermoplastic pipes adjacent to each other with the inside wall of one pipe having a nipple and one pipe having a socket.

The inside diameter of second end 56 is machined or shaved to form a female socket 62. In order to allow for a pipe joint having a substantially flush interior and substantially flush exterior, socket 62 is formed by increasing inside diameter of second end 56 and thereby decreasing the wall thickness. Referring to FIG. 14, one end of socket 62 is end wall 63 of second pipe 52 and at the other end of socket is lip 65 formed by the difference in inside diameter between second pipe 52 and socket 62. Between lip 65 and end wall 63 is socket interior surface 76.

The amount of decrease in wall thickness (and increase in inside diameter) of second end 56 is approximately equal to the decrease in wall thickness (and decrease in outside diameter) of first end 54. In the preferred embodiment, the wall thickness of both first end 54 and second end 56 are decreased by approximately one-half of the original wall thickness, however, any amount of decreased in wall thickness is acceptable provided the amount of decrease is equal in both first end 54 and second end 56 to provide a flush interior and exterior surface.

Figure 15:
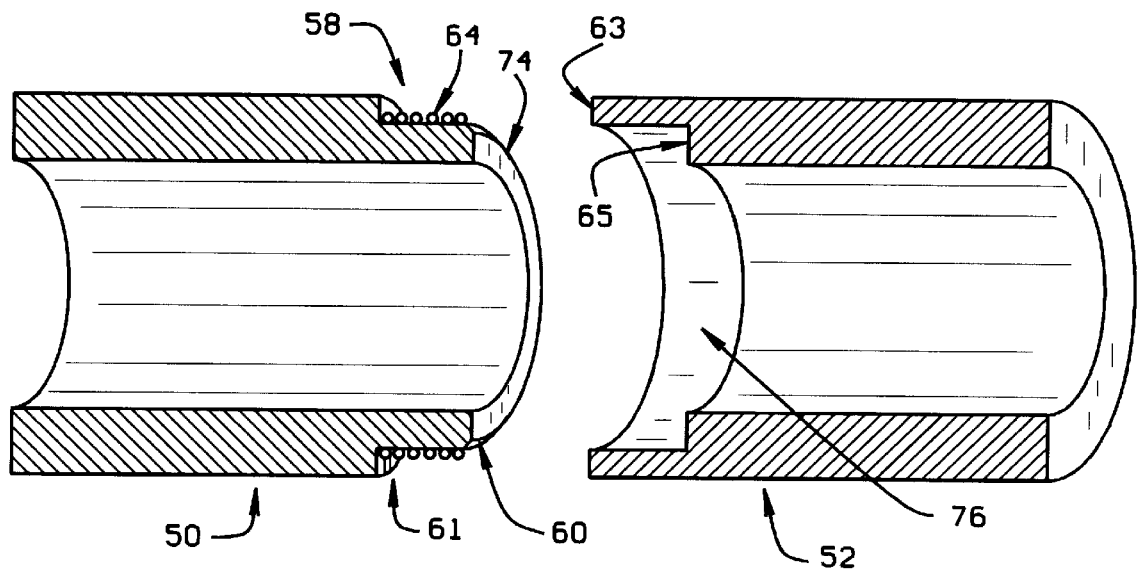
FIG. 15 is a perspective view of two solid wall thermoplastic pipes adjacent to each other with the inside wall of one pipe having a nipple and one pipe having a socket.

Referring to FIG. 15, the length of nipple 58, measured from shoulder 61 to the nipple edge 60, is equal to the depth of socket 62, measured from end wall 63 to lip 65. This allows the nipple 58 to have an interference fit within the socket 62 with the exterior surface 74 of the nipple 58 adjacent to interior surface 76 of socket 62, shoulder 61 of first pipe 50 abutted against end wall 63 of second pipe 52 and lip 65 of second pipe 52 abutted against nipple edge 60 of first pipe 50. The resulting joint having substantially flush interior and exterior and substantially uniform outside and inside diameters.

The nipple 58 has an electrical resistance element 64 embedded into the exterior surface 74 of the nipple. The electrical resistance element 64 is substantially identical to the electrical resistance element 32 of the first embodiment discussed above except for the configuration of the ends 66 and 68 and location of the terminal pins 70 and 72. However, the composition and characteristics of the electrical resistance element 64 and the terminal pins 70 and 72 are identical to the electrical resistance element 32 and the terminal pins 38 and 40, respectively. Therefore, the discussion above relate thereto is equally applicable herein.

Figure 13:
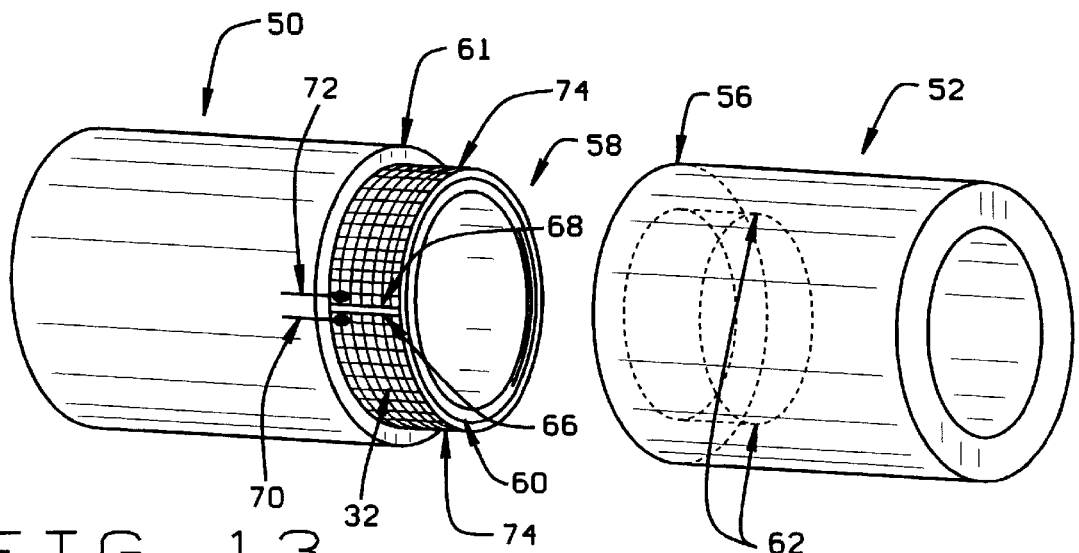
FIG. 13 is a dimensional view of two solid wall thermoplastic pipes adjacent to each other with the inside wall of one pipe having a nipple and one pipe having a socket.

In this second embodiment, as shown in FIG. 13, the electrical resistance element 64 has a length, measured between the ends 66 and 68, sufficient to substantially cover the exterior surface 74 of the nipple 58 and a width substantially equal to the length of nipple 58. Ends 66 and 68 are cut at the right angle to the length of the electrical resistance element and do not overlap. This allows extension of the terminal pins 70 and 72 between shoulder 61 of the first pipe 50 and the end wall 63 of the second pipe 52 for connection to power source (not shown).

The attachment of electrical resistance element 64 in this second embodiment to the exterior surface 74 of the nipple 58 is identical to the attachment of electrical resistance element 32 to exterior surface 24 of coupler 22 described above. In the alternative, electrical resistance element 64 may be attached to interior surface 76 of socket 62. As set forth in detail above, electrical resistance element 64 should be sufficiently close to both the interior surface 74 and the exterior surface 76 to cause fusion of the socket 62 within nipple 58 on energization of electrical resistance element 64.

Figure 16:
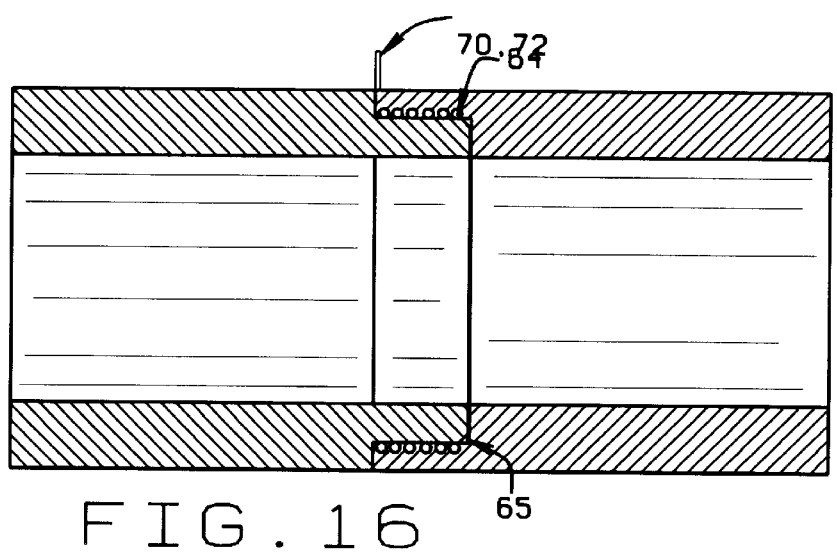
FIG. 16 is a cross sectional view of the two solid wall thermoplastic pipe sections of FIG. 15 after insertion of the nipple into the socket.

FIG. 16 shows the nipple 58 inserted within socket 62. As is shown, exterior surface 74 of the nipple 58 is adjacent the interior surface 76 of socket 62. The nipple edge 60 is abutted against the lip 65 and the end wall 63 is abutted against shoulder 61. The electrical resistance element 64 is embedded into the exterior surface 74 of the nipple 58 and is sufficiently close to the interior surface 76 of socket 62 to cause fusion of the nipple 58 to the socket 62 upon energization of the electrical resistance element 64. Terminal pins 70 and 72 extend between the abutted end wall 63 and the shoulder 61 to allow connection to power source (not shown).

Any power source capable of supplying adequate power to the electrical resistance element 64 is acceptable for the present invention. For example, a variable current electrical welder is acceptable as are any type of power supplies used in the prior art for fusion welding of thermoplastic pipes using electrofusion collars and inserts.

Preferably, an electrofusion control unit is used for the power source, as are known in the art, to furnish a predetermined amount of electrical current which is required to heat the screen 78 and partially melt exterior surface 74 of the nipple 58 and the interior surface 76 of socket 62. The nipple 58 expands during heating at a greater rate than the interior surface 76 of the socket 62 due to the attachment of the electrical resistance element thereon. This develops additional internal bonding pressure to produce a fusion bond of adequate depth and continuity to form a pressure tight pipe joint, that is substantially flush with the pipe walls, leaving no interior flow restrictions or exterior collars or obstructions.

A variety of power sources exist in the art which will supply the correct amount of current for each pipe size. Existing electrofusion control units are capable of measuring heat levels and/or maintaining a measured welding time at a predetermined current to form a structurally sound leakproof joint upon cooling. However any experienced fusion welder with charts showing the recommended current and heating time for each size and composition of pipe, is capable of forming a leak-proof joint using any available, variable ampere, direct current welder, as a power source.

Figure 17:
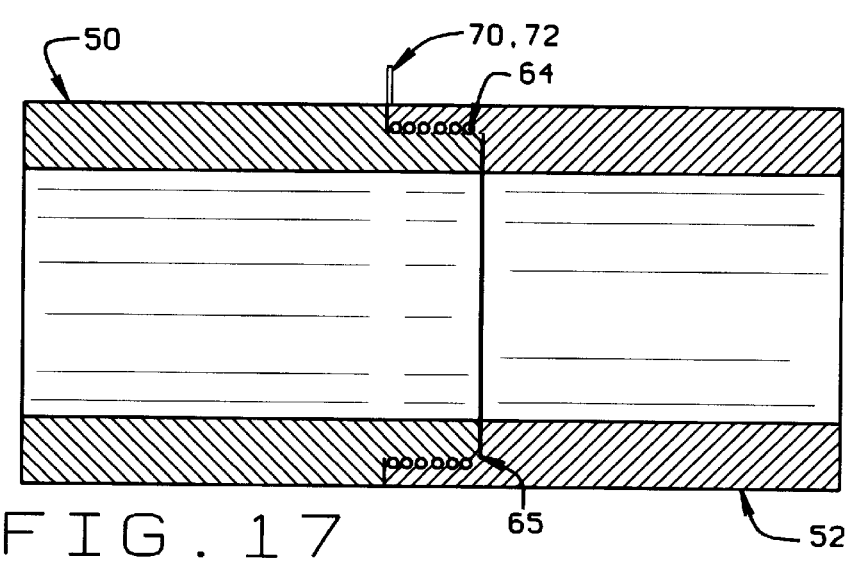
FIG. 17 is a cross sectional view of the two solid wall thermoplastic pipe sections of FIG. 16 after electrofusion welding.

FIG. 17 shows a complete joint using the present invention after screen 78 has been energized and the fusion weld is complete. As is shown, the present invention results in a substantially flush joint both interior and exterior and a substantially uniform outside diameter and inside diameter throughout the length of the joined pipes.

Having described the apparatus, a method for forming the pipe joint of a second embodiment between two solid thermoplastic pipes is explained. To practice the method of the present invention, a first pipe 50 is modified at a first end 54 to form a nipple 58 and a second pipe 52 is modified to form a socket 62 for receiving nipple 58 therein.

First pipe 50 and second pipe 52 have substantially equal outside diameters, substantially equal inside diameters and each has a substantially uniform circumference. First end 54 and second end 56 have substantially the same inside diameter and outside diameter as pipes 50 and 52.

To form nipple 58 the outside diameter of first end 54 is machined or shaved by decreasing outside diameter of first end 54 and thereby decreasing the wall thickness. The inside diameter of second end 56 is machined or shaved to form a female socket 62 by increasing inside diameter of second end 56 and thereby decreasing the wall thickness.

The amount of decrease in wall thickness of second end 56 is approximately equal to the decrease in wall thickness of first end 54. The length of nipple 58, measured from shoulder 61 to nipple edge 60, is equal to the depth of socket 62, measured from end wall 63 to lip 65. This allows nipple 58 to have an interference fit within socket 62 with exterior surface 74 of nipple 58 adjacent to interior surface 76 of socket 62 and shoulder 61 of first pipe 50 to abut against lip 65 of second pipe 52. The resulting joint having substantially flush interior and exterior and substantially uniform outside and inside diameters.

After forming nipple 58 and socket 62, an electrical resistance element 64 is embedded into the exterior surface 74 of nipple 58. An electrical resistance element, such as screen 78 is wrapped around exterior surface 74 of nipple 58. A clamp (not shown) or adjustable binder (not shown) is tightened over screen 78 urging screen 78 onto nipple 58. Terminal pins 70 and 72 should be aligned adjacent shoulder 61. This allows the extension of terminal pins 70 and 72 to extend between abutment of end wall 63 and shoulder 61 after nipple 58 is fully inserted into socket 62.

To embed screen 78 into exterior surface 74 of nipple 78, power source (not shown) is electrically connected to terminal pins 70 and 72. A positive lead is attached to one terminal pin, for example 70 and the negative lead from power source is attached to other terminal pin, for example 72. Screen 78 is then energized by power source (not shown) causing electrical current to flow through screen 78. Screen should be energized long enough to attach screen 78 sufficiently to nipple 58 to hold screen 78 in place during insertion of nipple 58 into socket 62. In the preferred embodiment, screen 78 is energized until nipple 58 begins to protrude through openings in screen 78.

After attachment of screen 78 to nipple 58, nipple 58 is inserted into socket 62. In the preferred embodiment, nipple 58 is fully inserted into socket 62. This allows nipple edge 60 to abut lip 65 and shoulder 61 to abut end wall 63 and provides an mating surface between exterior surface 74 of nipple 58 and interior surface 76 of socket 62. After nipple 58 of first pipe 50 is inserted into socket 62 of second pipe 52, screen 78 is energized, as described above by connecting power source to terminal pins 70 and 72. Screen 78 should be energized for a sufficient duration to cause nipple 58 to be fusion welded within socket 62. The amount of power and duration are determined by the types of thermoplastic material from which pipes are made and the amount of heat necessary to create the fusion weld. The amount of heat and power necessary is known in the art of electrofusion welding using electrofusion couplers and inserts.

Any power source capable of supplying adequate power to electrical resistance element 64 is acceptable for the present invention. For example, a variable current electrical welder is acceptable as are any type of power supplies used in the prior art for fusion welding of thermoplastic pipes using electrofusion collars and inserts.

After inserting nipple 58 with electrical resistance element 64 attached thereto into socket 62, a predetermined amount of electrical current is applied to the terminal pins 70 and 72 and the thermoplastic material on the nipple 58 softens and expands as it melts into the socket 62 providing additional fusion pressure as the socket interior surface 76 softens to fuse the two pipe sections together with adequate depth and uniformity to make a leak free and strong pipe joint with no interior flow obstructions or exterior collar or protrusions. The joint is made without the use of butt fusion machines or line up equipment necessary to provide longitudinal pressure to join the two pipe sections as required in the prior art.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. An electrofusion weld assembly for uniting a pair of substantially identical profile wall thermoplastic pipes, each of the pipes having an outer wall, an inner wall, an end wall, a helical rib located generally between the inner wall and the outer wall and joining the inner wall to the outer wall, and a recessed channel in the end wall for receiving a coupler therein, said weld assembly comprising:

a coupler uniting the end walls of the profile wall pipes and positioned within the channels, the coupler having an exterior surface adjacent the outer walls of the profile wall pipes and an interior surface adjacent the inner walls of the profile wall pipes; and an electrical resistance element sufficiently close to both the coupler and the profile wall pipe walls to cause the profile wall pipes to fuse to the coupler on energization of the electrical resistance element thereby forming a pipe joint having a substantially constant inner diameter and a substantially constant outer diameter.

2. The electrofusion weld assembly of claim 1 wherein the electrical resistance element is within the channel.

3. The electrofusion weld assembly of claim 2 wherein the electrical resistance element is embedded on the exterior surface of the coupler to cause the exterior surface of the coupler to fuse to the outer walls of the profile wall pipes on energization of the coupler.

4. The electrofusion weld assembly of claim 1 wherein at least one edge of the coupler is beveled.

5. The electrofusion weld assembly of claim 1 wherein the electrical resistance element is comprised of stainless steel screen.

6. The electrofusion weld assembly of claim 5 further comprising a second electrical resistance element embedded on the interior surface of the coupler to cause the interior surface of the coupler to fuse to the inner walls of the profile wall pipes on energization of the electrical resistance element.

7. A method of coupling a pair of profile wall thermoplastic pipes, each of said pipes having an inner wall, an outer wall and a helical rib between the inner wall and outer wall and joining said walls together, the method comprising the steps of:

forming a channel between the inner wall and the outer wall at an end of each of the profile wall pipes by removing a section of the helical rib to a predetermined distance from the pipe ends; and positioning a coupler within the channel in each of the profile wall pipes thereby uniting the ends of the pipes; and heating the coupler until the coupler is fusion welded to each of the profile wall pipes thereby forming a pipe joint having a substantially constant inner diameter and a substantially constant outer diameter.

8. The method of claim 7 wherein the step of heating the coupler is performed by electrofusion welding.

9. The method of claim 8 wherein the step of electrofusion welding comprises the steps of:

affixing an electrical resistance element to the coupler prior to positioning the coupler within the channels; and energizing the electrical resistance element after the coupler is positioned within the channels.

10. The method of claim 9 wherein the step of affixing the electrical resistance element to the coupler comprises the steps of:

positioning the electrical resistance element in contact with a surface on the coupler; and energizing the electrical resistance element while applying pressure to the electrical resistance element to urge the electrical resistance element into the surface of the coupler.

11. The method of claim 10 wherein the step of forming the channel between the inner wall and the outer wall comprises the step of removing a segment of the helical rib approximately one-half the width of the coupling.

12. The method of claim 11 wherein the step of removing the helical rib is performed by routing.

13. A profile wall thermoplastic piping system comprising:

a plurality of profile wall pipes adapted to be joined together end-to-end, each pipe having a generally cylindrical outer wall having a predetermined diameter, a generally cylindrical inner wall having a predetermined diameter and being substantially concentric with the outer wall and a helical rib located generally between the inner wall and the outer wall and joining the inner wall and outer wall together;

an annular insert having an insert inner diameter slightly larger than the outer wall diameter and an insert outer diameter slightly smaller than the outer wall diameter, the annular insert being engageable with the pipes by insertion between the inner walls and the outer walls; and an electrical resistance element sufficiently close to both the annular insert and the pipe walls to cause the pipes to fuse to the coupler on energization of the electrical resistance element, thereby forming a pipe joint having a substantially constant inner diameter and a substantially constant outer diameter.

14. The profile wall piping system of claim 13 wherein the electrical resistance element is comprised of stainless steel screen.

15. The profile wall piping system of claim 13 wherein the electrical resistance element is embedded on an exterior surface of the annular insert.

16. The profile wall piping system of claim 13 wherein the electrical resistance element is embedded on an interior surface of the annular insert.

17. The profile wall piping system of claim 13 wherein the annular insert has beveled edges.

* * * * *